United States Patent

Ebert

[15] 3,675,850
[45] July 11, 1972

[54] REACTIVELY DRIVEN ROTARY LIQUID DISTRIBUTOR

[72] Inventor: Herman G. Ebert, 522 Broadview Road, Upper Darby, Pa. 19082

[22] Filed: June 22, 1970

[21] Appl. No.: 47,987

[52] U.S. Cl................................239/254, 210/272, 239/97, 239/261, 239/262, 239/DIG. 1
[51] Int. Cl..........................................B05b 3/06
[58] Field of Search.............239/97, DIG. 1, 177, 251, 252, 239/253, 254, 255, 256, 257, 258, 259, 260, 261, 262; 210/272, 273

[56] References Cited

UNITED STATES PATENTS

| | | | |
|---|---|---|---|
| 2,459,244 | 1/1949 | Sellars | 239/DIG. 1 |
| 2,748,944 | 6/1956 | Kalinske | 239/DIG. 1 |
| 2,769,547 | 11/1956 | Hirsch | 239/254 X |
| 3,288,297 | 11/1966 | Stuart | 210/272 |
| 3,379,380 | 4/1968 | McGivern | 210/273 X |
| 3,412,863 | 11/1968 | Stuart, Sr. | 210/273 X |
| 150,595 | 5/1874 | McKensie | 239/DIG. 1 |
| 3,352,493 | 11/1967 | Curtis | 239/177 |

FOREIGN PATENTS OR APPLICATIONS 130,743  1/1949  Australia ........................239/261

Primary Examiner—M. Henson Wood, Jr.
Assistant Examiner—Reinhold W. Thieme
Attorney—Barry Moyerman

[57] ABSTRACT

A reactively driven rotary liquid distributor or sweep, of particular use for cleaning generally rectangular filter beds, delivers a patterned spray. Two sets of nozzles, each fed by a separate conduit, are mounted on radially extending sweep arms. One set provides the reactive force and distributes liquid in a generally circular pattern. The other set, mounted on the ends of the arms, selectively covers the corner areas. Liquid flow to the conduits is through the central suspension on which the arms are rotatably mounted. The suspension includes an integral multi-port rotary valve and, as the suspension rotates, the conduits supplying the corner-directed nozzles move in and out of alignment with arcuately extending peripherally spaced ports. Thus, liquid is supplied to these nozzles only when the ends of the sweep arms are proximate the corners of the filter bed. The other nozzles operate throughout 360° of sweep rotation. Liquid is therefore distributed in a rectangular or square pattern which conforms to the shape of the filter bed.

5 Claims, 5 Drawing Figures

INVENTOR
HERMAN G. EBERT
BY Barry Moyerman
ATTORNEY

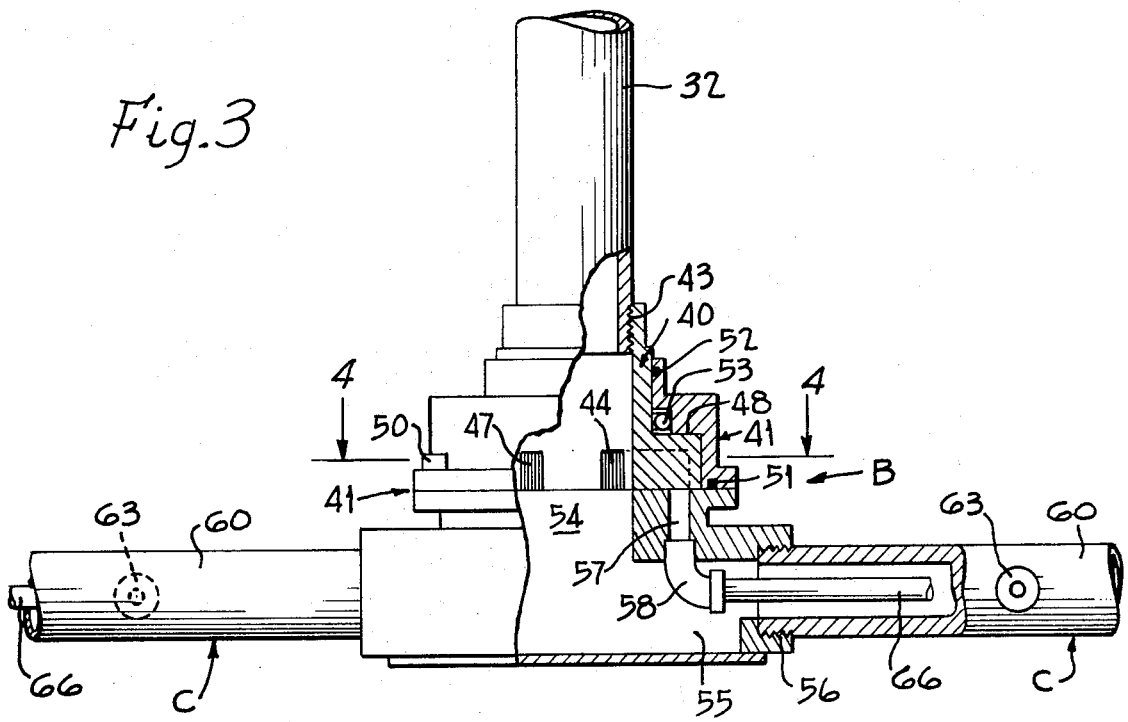
Fig.3
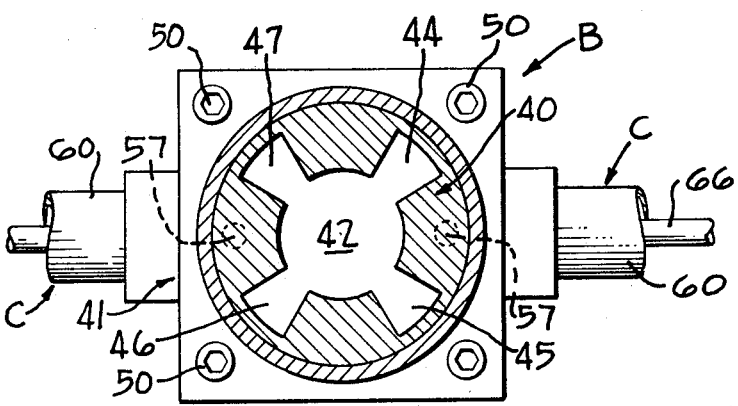
Fig.5
Fig.4
INVENTOR
HERMAN G. EBERT
BY Barry Moyerman
ATTORNEY

3,675,850

REACTIVELY DRIVEN ROTARY LIQUID DISTRIBUTOR

BACKGROUND OF THE INVENTION

1. Field of the Invention

The invention pertains to liquid sprinkling, wherein a distributor continously moves relative to a support during liquid discharge. More particularly, it pertains to a patterned reactively driven rotary sweep which is associated with a particulate filter bed.

2. Prior Art

Reactively driven rotary filter sweeps are well known in the prior art and are extensively utilized in connection with backwashing of particulate filter beds, such as are used in water purification and sewage treatment. Such devices are shown, inter alia, in U.S. Pats. Nos. 2,309,916; 3,288,297; 3,374,896; 3,379,380; and 3,412,863. They may also be used as liquid distributors, for example, during forward flow of trickling filters. The moving arms are generally rotatively mounted on a central inlet pipe by a rotary joint such as that shown, for example, in U.S. Pat. No. 2,903,278.

Particulate filters such as sand and gravel filters are frequently rectangular or square in plan view. Yet, sweeps for these filters customarily distribute liquid in a circular pattern. If the diameter of the circle described by the spray pattern is such that it is circumscribed by the square or rectangle with which it shares a common center, it is apparent that the corner portions of the filter will not receive liquid and that the turbulence necessary for backwashing will be imperfect. This problem is fully discussed in U.S. Pat. No. 2,769,547. On the other hand, if the spray pattern describes a circle large enough to include the corners of the filter then, as the sweep arms travel between corners, there will be impingement of liquid against the sides of the filter walls. Continued flow of water against a concrete surface, as would then be the case, causes erosion over a period of time and further creates eddies which would not otherwise occur.

Patterned spraying devices are legion in the lawn sprinkling and irrigation art (e.g. U.S. Pats. Nos. 2,859,064 and 2,988,257) and exist even in the leaching art (e.g. U.S. Pat. No. 150,595). However, such devices have not been adopted in filter sweep construction.

SUMMARY OF THE INVENTION

Briefly summarized, the invention comprises a reactively driven rotary liquid distributor or filter sweep which distributes liquid evenly over the surface of a square or rectangular bed in a pattern conforming thereto. Using a plurality of such sweeps, rectangular beds which are made up of adjoining modular beds can also be evenly swept.

The sweep has conventional radial arms which are mounted from a central suspension and are rotated about the suspension by reactive forces. The arms are provided with two sets of nozzles. A first set is conventional and provides the reactive forces while distributing liquid in a generally circular pattern. Orientation and sizing of these nozzles to minimize channeling of the bed and achieve uniform liquid distribution is in accordance with the prior art. However, the second set of nozzles serves the corners and is mounted on the arms, preferably at the ends, oriented to cover the corners as the sweep rotates. A first conduit feeds the first set of nozzles and a second separate conduit feeds the second set.

Means are provided, linked to the inlet liquid line, to feed the first conduit through 360° of rotation but to feed the second only when the arms are proximate the corners. This may take the form of a multi-port rotary valve integral with the central suspension joint.

Accordingly, it is an object of the invention to provide a rotary sweep adapted for use with a square or rectangle which delivers liquid in a conforming pattern, thereby overcoming the disadvantages of the filter sweeps of the prior art, discussed above.

It is also an object of the invention to provide a patterned filter sweep which is economic to build, rugged in construction, simple in operation and has a minimum of moving parts.

Other objects of the invention will be apparent to those skilled in the art from a consideration of the description of an exemplary embodiment thereof which follows. It should be appreciated that the foregoing abstract and summary are intended as tools for information retrieval and are not included for purposes of limiting or interpreting the true scope of the invention. This is the function only of the appended claims.

DESCRIPTION OF THE DRAWINGS

In the drawings, wherein like reference letters and numerals designate, respectively, like assemblies and parts:

FIG. 3 is a fragmentary detail, partly in section, of the central suspension portion of the sweep shown in FIG. 1.

FIG. 4 is a section taken on line 4—4 of FIG. 3.

FIG. 5 is a fragmentary detail, partly in section, of the end of one of the sweep arms.

DETAILED DESCRIPTION OF A PREFERRED EMBODIMENT

Figure 1:
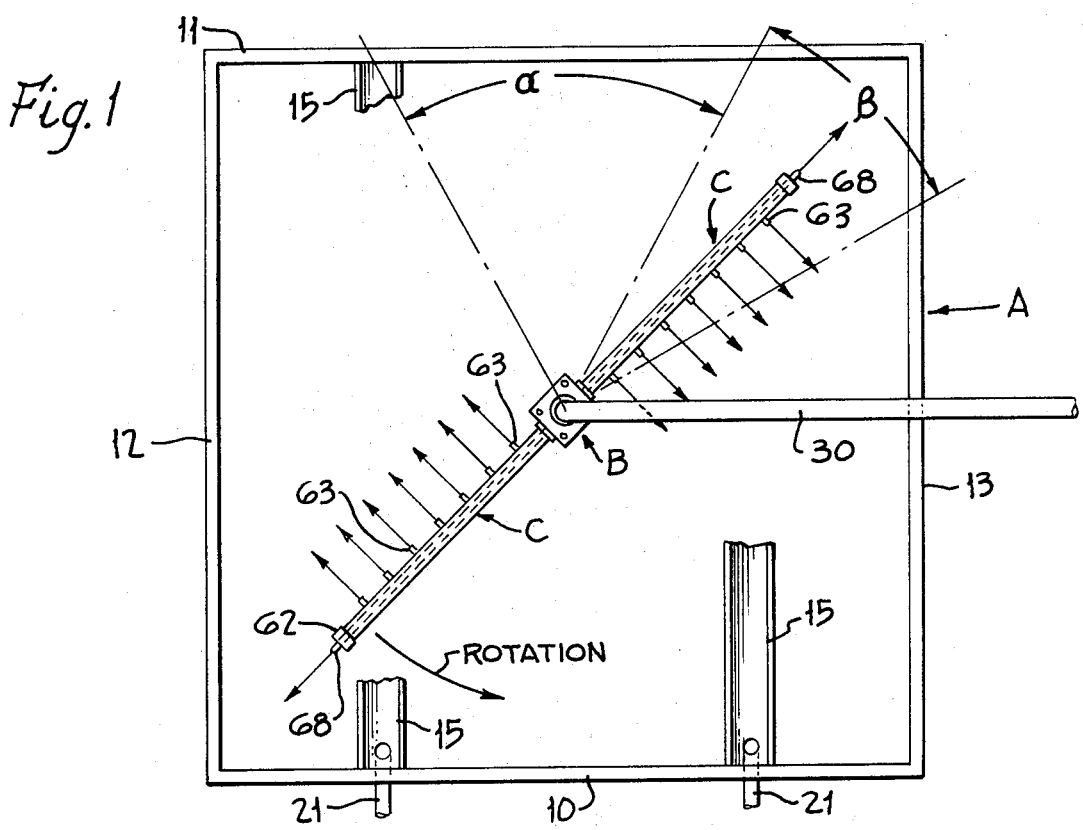
FIG. 1 represents a plan view of a square filter equipped with a filter sweep embodying the invention.
Figure 2:
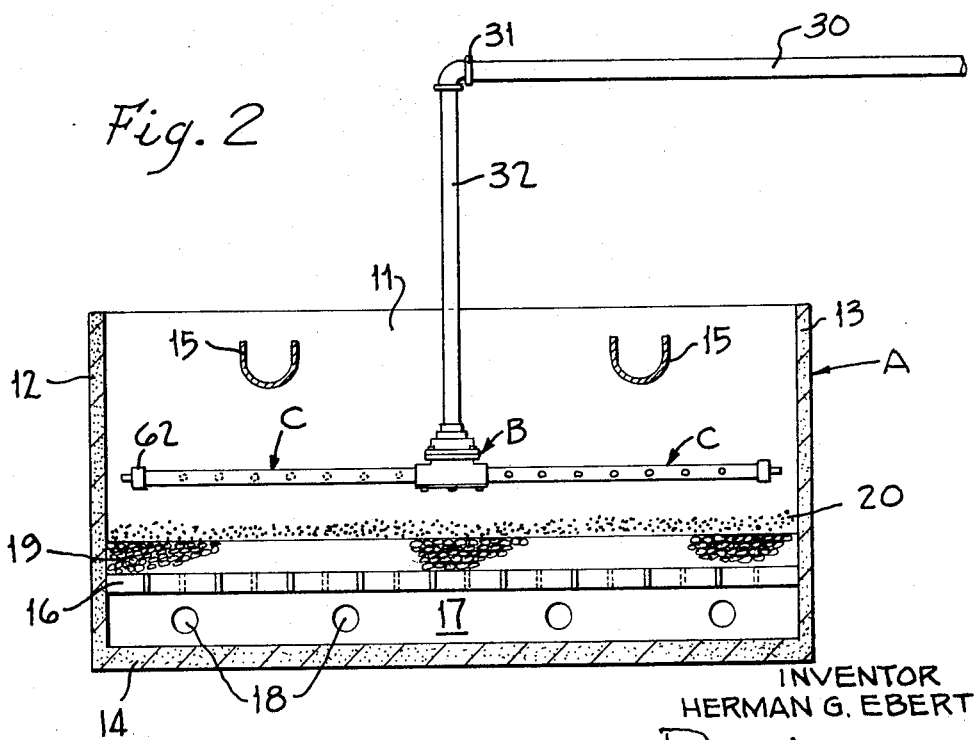
FIG. 2 represents a section taken through the filter shown in FIG. 1.

A filter sweep embodying the invention is shown in FIGS. 1 and 2. This sweep is intended for use in connection with a particulate bed gravity filter, during the backwash portion of its cycle. The same apparatus, in other embodiments, could serve as a distributor for liquor fed to other types of particulate bed filters such as, for example, trickling bed filters wherein the particulate material is stone.

The particulate bed filter, generally A, forms no part of the invention and will therefore be described in a cursory manner. It includes a front wall 10, rear wall 11, side walls 12 and 13, a bottom 14 and a plurality of troughs 15 which span the filter from end to end proximate the top thereof. The filter is preferably made of concrete and the troughs may be made of a suitable corrosion-resistant material. A transverse foraminous bottom 16 supports the filter medium and defines a clear water well 17 from which filtered water is removed by a plurality of drains 18. The filter shown is a sand and gravel filter containing a lower bed of gravel 19 and an upper bed of sand 20. The bed performs the actual filtering, bottom 16 serving only as an underdrain and support for the bed.

In operation, the filter is supplied with liquid to be filtered at a rate such that the liquid level is near the tops of walls 12 and 13. The liquid moves by gravity through particulate material 19 and 20 into well 17 and thence through drains 18. The filter is backwashed by draining it and then introducing clear flushing water into well 17 through a clear water inlet (not shown) so that it rises through the particulate material carrying away dirt which overflows into the troughs 15 and is conveyed by them to a drain line 21, which is valved shut except during backwash. It is during backwash that the sweep shown in FIGS. 1 and 2 is utilized to help agitate and scour the fine particles of filter medium.

A relatively small portion of the total quantity of water required for the backwash operation is supplied under pressure, preferably above 60 p.s.i.g., to horizontal line 30 and passes through elbow 31 into a vertical inlet pipe 32, which is centrally mounted above the filter bed. Brackets (not shown) may be used to support the pipe and keep it fixed in position. Mounted on the end of the inlet pipe is a suspension joint, generally B, which is shown in detail in FIGS. 3 and 4.

Suspension joint B comprises a fixed portion, generally 40 and a rotatable portion, generally 41. Portion 40 includes a channel 42 which extends along its vertical axis. Its inlet is internally threaded, as at 43, so that the joint may be threadedly mounted on pipe 32. Portion 40 also includes arcuate ports 44, 45, 46 and 47 — spaced 90° apart around channel 42 — into which they open. An external shoulder, 48, is provided whereby portion 41 is mounted on fixed portion 40.

Portion 41 is transversely split into an upper and lower section which may be joined, as with a plurality of bolts 50. An "0" ring 51 provides a water-tight seal between the two sections. Another "0" ring 52 provides similar sealing of the upper section of portion 41 where it encircles fixed portion 40. Portion 41 is rotatably mounted on shoulder 48 with an annular anti-friction bearing assembly 53. Internally, portion 41 is provided with a T-shaped channel having an inlet 54 and a plurality of outlets 55. Inlet 54 is, in effect, a continuation of channel 42 and is in co-axial registration therewith. Outlets 55 are internally threaded, as at 56, to receive and support, in cantilevered fashion, the sweep arms, generally C. Portion 41 also includes a plurality of passages 57 which move with it about its axis of rotation. The inlet of the passage moves, successively, in and out of registration with ports 44, 45, 46 and 47 as rotation occurs. The passages terminate in a short radius elbow 58 which may be threadedly mounted in the outlet or otherwise joined thereto.

Sweep arms C will now be described in detail. These are provided in opposed pairs, spaced 180° apart, and the embodiment shown has two such arms. One passage 57 and one outlet 55 is provided for each arm C. Arm C is essentially a tube, in this embodiment one having a circular cross-section, namely pipe 60, which is externally threaded at both ends. The threads on the proximate end are used for mounting the pipe on companion threads 56 of outlet 55. The threads 61 on the distal end receive a cap 62. Mounted in the walls of pipe 60 are a plurality of nozzles 63. Enough of these nozzles or jets are spaced on the side of arm C, opposite from its direction of rotation, to provide the necessary reactive force to move the sweep. The angle of the jets with respect to the horizontal, their radial spacing, their spray pattern and their capacity are all determined in accordance with the prior art in order to maximize the turbulence and enhance the cleaning action during the backwash cycle. Nozzles 63 constitute a first set and their total distribution pattern is generally circular. The distal end of pipe 60 is provided with a plug 64 having an internally threaded central orifice 65 which opens into the interior of cap 62.

A second tubular member, such as pipe 66, is concentrically mounted within pipe 60 and extends between elbow 58 and plug 64. *Its distal end may be threadedly mounted in orifice 65* and secured with a lock nut 67. Pipe 66 conducts water from passage 57 to the interior of cap 62. On the end of cap 62 are mounted a second set of nozzles 68 which are oriented toward the corners of filter A. The annular space between pipes 66 and 60 constitutes a first conduit supplying water to nozzles 63, whereas nozzles 68 are separately supplied by pipe 66.

The operation of the device is as follows. Water, which is supplied under pressure, reaches joint B via pipes 30 and 32 — filling channel 42 and communicating ports 44, 45, 46 and 47. Water flows from channel 42 into inlet 54 and, via outlets 55, into the first annular conduit between pipes 66 and 60. Jets of water spray from nozzles 63 and rotation of the sweep begins in the direction shown by the arcuate arrow in FIG. 1. This rotation continues as long as water is supplied to the suspension.

During the portion of rotation indicated by the arc "alpha" (FIG. 1) only nozzles 63 are in operation. However, during the portion marked "beta," passage 57 is in registration with port 44. A similar action occurs simultaneously 180° away with respect to the other arm C. The angle "beta" is a function of the angle of the sector described by the ports. The alignment of passage 57 with any one of the ports causes nozzle 68 to be activated and this occurse, for each sweep, every 90° more or less. While only one nozzle 68 has been shown, several can be used and positioned at or proximate the end of the sweep arm — all being supplied by second conduit 66.

The ports shown in FIG. 4 (i.e. ports 44-47 inclusive) have been described herein as "arcuate." This is intended to mean that they extend peripherally through a number of degrees of arc. While they are shown as pie-shaped (and thus are radially extending as well as arcuately extending) this need not be their shape. They may be crescent shaped or shaped liked curved sausages in plan view with connection to channel 42 being via a drilled passage. Further, their contour will determine the relationship between volume of water flowing from the second set of nozzles and the rotary orientation of arm C. Flow is not full-on or full-off at all times. With the embodiment shown in FIG. 5, for example, it is obvious that full flow will not occur until the cross-section of passage 57 is fully within the cross-section of a port. When the ports are crescent shaped or otherwise contoured, their cross-section at a given point vs. the cross-section of passage 57 determines how many degrees of arm rotation are required from the onset of flow to the achievement of full flow. The design of the ports can thus be related to the particular shape of the corner portions of the filter bed surface, a consideration making the design adaptable to square or rectangular filters.

It will be apparent to those skilled in the art that numerous changes and modifications may be made within the scope of the invention. Consequently, it is not to be construed as limited to the specific details of the specific embodiment which has been described above. Rather, it is to be limited only by a reasonable interpretation of the appended claims.

I claim:

1. A reactively driven rotary liquid distributor for a generally square filter bed comprising: a fixed vertical inlet pipe centrally mounted above the filter bed; a suspension joint including a fixed portion, mounted on the end of said inlet pipe, and a rotatable portion, dependent from said fixed portion; opposed radially extending arms mounted on said rotatable joint portion, each arm including a first conduit and a second conduit; a plurality of nozzles mounted on each of said arms including a first set of nozzles, connected to said first conduit, and a second set of nozzles, connected to said second conduit, mounted on the same arm proximate the end thereof and oriented to spray the corners of the filter bed; a liquid flow channel integral with said suspension joint which links said inlet pipe and said first conduit at constant cross-section through 360° of rotation of said distributor; and a valve, integral with said suspension joint, selectively linking said inlet pipe and said second conduit and permitting flow therethrough only when the ends of said arms are proximate the corners of the filter bed; flow of liquid under pressure through said inlet causing said arms to rotate reactively and liquid to be distributed over the surface of the filter bed by the nozzles mounted on said arms in a generally square pattern.

2. The distributor of claim 1 wherein said valve comprises a plurality of arcuate extending spaced-apart ports, which are linked to said inlet pipe hydraulically and which are located in said fixed joint portion, and said rotatable joint portion includes a passage opening into said ports, through which liquid flows to said second conduit, rotation of said distributor moving said passage successively in and out of registration with said ports to start and terminate flow through said second conduit.

3. The distributor of claim 1 wherein said radially extending arms are tubular and have, concentrically mounted within them, said second conduit which is also tubular, the annular space between said tubes constituting said first conduit.

4. The distributor of claim 2 wherein said radially extending arms are tubular and have mounted within them, concentrically, said second conduit which is also tubular, the annular space between said tubes constituting said first conduit.

5. The distributor of claim 4 wherein the cross-section of said arms is circular and the cross-section of said second conduit is also circular.

* * * * *